3,754,034
PROCESS FOR THE NUCLEAR CHLORINATION OF AROMATIC AMINES IN THE PARA POSITION
Henry Peter Crocker, Hornsea, England, assignor to Reckitt & Colman Products Limited, Hull, England
No Drawing. Filed Mar. 31, 1970, Ser. No. 24,356
Claims priority, application England, Mar. 31, 1969, 16,771/69
Int. Cl. C07b 9/00; C07c 87/52
U.S. Cl. 260—578                           7 Claims

ABSTRACT OF THE DISCLOSURE

A process for the nuclear chlorination of aromatic amines of the formula:

$$ArNR^1R^2$$

wherein Ar, $R^1$ and $R^2$ represent certain specified substituents comprises contacting at least one of the said amines with cupric chloride in an aqueous medium containing hydrochloric acid in excess of that required for neutralization of the said amine or amines, at a reaction temperature in the range of from 50 to 150° C. A continuous process for the said chlorination comprises contacting the said reactants under the above conditions, continuously passing an oxygen containing gas ito the reactor, separating the chlorinated amine so formed, and recycling any unchanged material into the reactor.

---

This invention relates to the chlorination of aromatic amines, and in particular to a process for the nuclear chlorination of aromatic amines using cupric chloride and hydrochloric acid.

Chlorinated aromatic amines are valuable chemical compounds which are used in the synthesis of many organic compounds, such as dyestuffs and pharmaceuticals. Of particular importance, is p-chloroaniline which is used in the preparation of the antimalarial chlorolguanide, the antibacterial chlorhexidine and the persistent herbicide monuron.

Attempted chlorination of primary and secondary aromatic amines with molecular chlorine usually results in rapid oxidation and the production of tarry products, thus the product from aniline is a black tarry material. In the case of tertiary amines such as dimethylaniline the product consists mainly of the 2-chloro- and 2,4-dichloro-derivatives with very little of the 4-chloro-derivative.

Chlorinated aromatic amines are, therefore, usually manufactured by less direct routes such as the reduction of corresponding chloro-nitro compounds. It is also possible to protect a primary or secondary amine group by acetylation thus forming the N-acetyl derivative which is not oxidized by molecular chlorine. With protected amines such as acetanilide under such chlorination conditions much ortho chlorination occurs. It is then necessary, of course, to remove the protecting group, and in this way two additional steps have been required to produce a mixture of 2-chloro, 4-chloro- and 2,4-dichloroaniline.

It has now been shown that aromatic amines are unaffected by treatment with cuprous chloride and oxygen, whereas aqueous cupric chloride rapidly oxidises amines, anilines giving tars, and N,N-dimethylaniline giving tetramethylbenzidine. It has surprisingly been shown that this oxidation is much reduced in the presence of an excess of hydrochloric acid and moreover that nuclear chlorination can be accomplished.

Accordingly the present invention provides a process for the nuclear chlorination of aromatic amines of formula:

$$ArNR^1R^2 \quad (I)$$

wherein $R^1$ and $R^2$ may be the same or different and represent a hydrogen atom, an alkyl group containing up to 12 carbon atoms or an aralkyl group containing up to 12 carbon atoms, and Ar represents a phenyl or naphthyl group which groups may be substituted by hydroxy, an alkoxy group containing up to 6 carbon atoms, an alkyl group containing up to 12 carbon atoms or halogen groups or by the group $NR^1R^2$ where $R^1$ and $R^2$ are as defined above, which process comprises contacting at least one of said amines with cupric chloride in an aqueous medium containing hydrochloric acid in excess of that required for the neutralisation of the said amine or amines, at a reaction temperature in the range of from 50° to 150° C. and recovering the chlorinated amine so formed.

Amines which may be chlorinated by the process include aniline, N-methyl aniline. N,N-dimethylaniline, o-, m-, and p-anisidine, o-, m-, and p-phenetidine, o-, m-, and p-chloroaniline, o-phenylene diamine, α- and β-naphthylamine, o-, m-, and p-toluidine, o, m and p-xylidine, N-benzylamine, p-ethylaniline, o-tert-butylaniline or 2,6-di-tert-butylaniline.

The aqueous medium will generally comprise at least 50% water but it may contain a proportion of one or more organic solvents such as acetic acid, methanol or sulpholane, particularly in those cases where the amine hydrochloride is only sparingly soluble in water.

The amount of hydrochloric acid required is at least two moles per mole of amine, and preferably the solution is saturated with hydrogen chloride. In the presence of an excess of hydrogen chloride the tendency for cupric chloride to oxidise the amine to form complex tars is virtually eliminated. Further, the rate of nuclear chlorination is enhanced.

In practice it has been found desirable to work with at least 2 moles hydrogen chloride per mole of amine, that is to say with an excess of 1 mole hydrogen chloride over that required to form amine hydrochloride. However, the rate of chlorination understandably varies from amine to amine and whereas say, aniline requires a saturated solution of hydrogen chloride and indeed slight pressure to maintain the conditions of saturation at elevated temperatures, chlorination of another amine may proceed at a quite satisfactory rate with an excess of hydrogen chloride as low as 0.1 mole per mole of amine.

Preferably an excess of hydrochloric acid, which may be provided by introducing anhydrous hydrogen chloride into the reaction mixture, is added to the reaction mixture before the chlorination reaction is initiated. Hydrochloric acid or gaseous hydrogen chloride may however be added to the reaction mixture during the course of the chlorination reaction, in one or more stages, to provide the excess of hydrochloric acid required in the process of the invention. Even when hydrochloric acid is added to the reaction mixture before chlorination is initiated, it may be found desirable to add further hydrochloric acid, or gaseous hydrogen chloride, in one or more stages during the course of the chlorination reaction.

The preferred reaction temperature is dependent upon the nature and the reactivity of the amine. Strongly basic amines may be chlorinated at temperatures of about 90° C. Aniline chlorinates only rather slowly at 100° C. and a temperature of 110° to 120° C. is preferred, and under these conditions a slight pressure is required to ensure dissolution of sufficient hydrogen chloride. When electron-withdrawing groups are already present as substituents in the molecule, e.g. halogenated anilines, the rate of chlorination is much reduced and reaction temperatures of 120° to 150° C. are required.

Two moles of cupric chloride are required per mole of amine to produce one mole of the chlorinated product.

With aniline an excess of cupric chloride over this amount (e.g. 3 or 4 moles per mole of amine) causes oxidation.

The chlorinated products may be isolated from the reaction medium by neutralising with alkali, for example, ammonia, or in favourable cases where the hydrochloride of the chlorinated amine crystallises out on cooling, the product may be collected. In practice, in this latter case the crystalline material is often combined with some cupric chloride.

Unlike known chlorination processes for the nuclear chlorination of aromatic amines the present process gives almost entirely the parachloro derivative (ortho substitution results if the para position is already occupied; otherwise chlorination is more rapid in the para-position).

After the removal of the clorinated product it is possible to regenerate the cupric chloride by treating the aqueous reaction mixture with air or oxygen and hydrochloric acid or hydrogen chloride thus regenerating the reaction medium. A further batch of amine may be added and the chlorination process repeated. Thus it is possible to combine the chlorination reaction with a cupric chloride regeneration step and operate a batchwise or continuous process. In the case of aniline the two processes may be represented by the following equations:

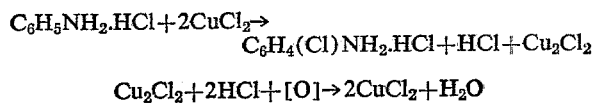

$$Cu_2Cl_2 + 2HCl + [O] \rightarrow 2CuCl_2 + H_2O$$

The net effect of the two processes being the consumption of hydrogen chloride and oxygen.

The present invention thus also provides a continuous process for the chlorination of aromatic amines, which process comprises contacting at least one of the said amines of Formula I as hereinbefore defined, with cupric chloride in an aqueous medium comprising hydrochloric acid and continuously passing an oxygen containing gas into the reactor and separating the chlorinated amine so formed.

In this particular mode of operation of the process of the invention, the cupric chloride is generally employed in a catalytic amount of from 0.1 to 1.5 moles cupric chloride per mole of amine, and preferably in the range of from 0.2 to 1.0 mole per mole of amine. Preferably hydrochloric acid or hydrogen chloride gas is continuously added to the reaction mixture to replace the hydrogen chloride consumed in the above reaction.

Preferably the oxygen containing gas is air or oxygen.

In the batchwise operation of the process of the invention it is believed that cuprous chloride retards the chlorination reaction and thus as the reaction proceeds more cuprous chloride is formed further retarding the reaction, moreover the amount of cupric chloride diminishes leading to further slowing of the reaction. The great advantage in the continuous process detailed above is that the cuprous chloride is removed continuously from the reaction mixture and thus its retarding effect does not occur. Furthermore, the amount of cupric chloride remains constant and a high reaction rate is therefore achieved. Thus less than the stoichiometric amount of cupric chloride may be used, and a higher rate of production per unit volume is achieved. Furthermore, the reaction temperature may be reduced substantially and a fast chlorination rate will be achieved.

As the solubility of oxygen (which largely governs the rate of oxidation of cuprous chloride) in hydrochloric acid is low at high temperatures the optimum temperature for the combined process is lower than that proposed for the two-step chlorination regeneration process. Preferably the continuous process is operated at a temperature in the range 70° to 110° C., for example at a temperature of from 80° to 100° C.

In a particular aspect of this invention there is provided a process for the preparation of p-chloroaniline.

In the working up of the reaction mixture it has been found preferable to add the reaction mixture, or the precipitated amine hydrochloride, to the alkali rather than vice versa.

The invention is further illustrated by the following examples:

EXAMPLE 1

A mixture of aniline (9.3 g.), concentrated hydrochloric acid (25 ml.) and cupric chloride dihydrate (34 g.) was heated at 100° C. for 4 hours. The reaction mixture was made alkaline by adding it to an excess of ammonia and then extracted with ether. The ether extracts were dried with potassium hydroxide, and the ether was removed leaving a pale brown oil (9.8 g.). A sample of this oil was examined by vapour phase chromatography (V.P.C.) and only aniline (77%) and p-chloroaniline (23%) could be detected.

EXAMPLE 2

A mixture of N,N-dimethylaniline (12.1 g.), concentrated hydrochloric acid (25 ml.) and cupric chloride dihydrate (34 g.) was heated at 108° C. for 1½ hours. The mixture was treated as in Example 1, giving a pale brown oil (13.4 g.), shown by V.P.C. to consist only of N,N-dimethylaniline (35%) and p-chloro - N,N-dimethylaniline (65%).

EXAMPLE 3

A mixture of o-toluidine (10.7 g.; 0.1 mole), concentrated hydrochloric acid (50 ml.) and cupric chloride dihydrate (17 g.; 0.1 mole) was heated at 85° to 90° C. for 16½ hours whilst a slow stream of equal volumes of hydrogen chloride and oxygen was passed through the mixture. The mixture was treated as in Example 1 giving an oily residue. The residue was distilled and the distillate (12.4 g., B.P. 164° C./70 mm.) was shown by V.P.C. to consist of o-toluidine (2.5%), 4-chloro-2-methyl aniline (97.5%) with traces of a higher-boiling component.

EXAMPLE 4

The method of Example 3 was repeated with p-anisidine (12.3 g.; 0.1 mole) in place of o-toluidine. The distillate (4.3 g.) was shown by V.P.C. to consist of p-anisidine (11%) and 2-chloro-4-methoxyaniline (89%).

EXAMPLE 5

The method of Example 3 was repeated with aniline (9.3 g.; 0.1 mole) in place of o-toluidine. The crude product (11.2 g.; M.P. 68° to 70° C.) gave on distillation (B.P. 114° to 116° C./14 mm.) a colourless solid, M.P. 70° (9.3 g.), shown by V.P.C. to consist of aniline (1%), p-chloroaniline (94%) and 2,4-dichloroaniline (5%).

EXAMPLE 6

N,N-dimethylaniline (12.2 g.; 0.1 mole) was dissolved in concentrated hydrochloric acid (25 ml.) and cupric chloride dihydrate (3.4; 0.02 mole) was added. The mixture was stirred and heated at 100° C. whilst a mixture of hydrogen chloride and oxygen was slowly passed in. After 15 hours the clear green solution was basified by cautious addition to an excess of ice-cold, dilute ammonia solution. The liberated oil was recovered by ether extraction. The oil (15.5 g.) was shown by V.P.C. to consist of p-chloro-N,N-dimethylaniline, (40%) o-chloro-N,N-dimethylaniline (5.7%) and N,N-dimethylaniline (54.3%).

EXAMPLE 7

A mixture of aniline (65.1 g.; 0.7 mole) in concentrated hydrochloric acid (140 ml.) was added to a solution of cupric chloride dihydrate (119 g.; 0.7 mole) in fuming hydrochloric acid (700 ml.). The resulting suspension was stirred and heated at 90° C. for 22 hours while oxygen and hydrogen chloride were passed in, each at 0.2 mole/hr. The mixture was cooled in ice, filtered and the solid was dissolved in water (900 ml.). The aqueous solution was filtered to remove a little black polymer (0.6 g.) then added to an excess of ice-cold dilute ammonia solution. The precipitate of p-chloroaniline (68.1 g.; M.P. 70°, 98% pure by V.P.C.) was collected, washed and dried. Extraction of the aqueous mother-liquor with ether gave an oil (15.3 g.) consisting of aniline (65%) with p-chloroaniline (30%) and small amounts of o-chloro- and 2,4-dichloroaniline.

EXAMPLE 8

A slow stream of equimolar amounts of oxygen and hydrogen chloride was passed with stirring through a suspension of α-naphthylamine hydrochloride (18 g.) in concentrated hydrochloric acid (80 ml.) containing cupric chloride dihydrate (17 g.) for 10 hours, at a temperature of 98–100° C. The resulting mixture was cooled in ice, and the amine hydrochloride was filtered off, and washed with cold hydrochloride acid to remove copper chloride. The solid was then added to an excess of ice-cold ammonia solution and the liberated base was collected, dried and distilled under reduced pressure. The resulting product (18.5 g.) of B.P. ca. 150°/0.5 mm.) was found by V.P.C. to consist of 2,4 - dichloro-α-naphthylamine (95%), 4-chloro-α-naphthylamine (5%) and a very small trace of α-naphthylamine. Recrystallisation from ethanol gave the pure dichloro derivative, M.P. 78°.

I claim:

1. A process for the nuclear chlorination of an aromatic mono-amine being unsubstituted in the para position with respect to the amino group, said amine having the formula:

$$ArNR^1R^2$$

wherein $R^1$ and $R^2$ are each selected from the group consisting of hydrogen and methyl, and Ar is selected from the group consisting of phenyl and naphthyl which may be substituted by alkoxy containing up to 6 carbon atoms, alkyl containing up to 12 carbon atoms and halogen, which process consists essentially of contacting said amine in the form of the amine hydrochloride with cupric chloride in the presence of an aqueous solution of hydrochloric acid in excess of that required to neutralise the amine component, the chlorination reaction being carried out at a reaction temperature in the range of from 50° to 150° C. to effect chlorination in the para position of said amine starting material, and recovering the chlorinated amine so formed.

2. A process as claimed in claim 1 wherein the amine starting material is selected from the group consisting of aniline and ortho toluidine.

3. A process as claimed in claim 1 wherein the reaction mixture is saturated with hydrogen chloride at the reaction temperature at which chlorination is carried out.

4. A process as claimed in claim 1 wherein hydrochloric acid or gaseous hydrogen chloride is added to the reaction mixture in one or more stages during the course of the chlorination reaction.

5. A process for the continuous chlorination of an aromatic amine as defined in claim 1, which process consists essentially of contacting said amine with cupric chloride in accordance with claim 1, and additionally passing an oxygen-containing gas continuously into the reactor and separating the chlorinated amine so formed.

6. A process as claimed in claim 4 wherein the cupric chloride is employed in an amount of from 0.2 to 1.0 moles cupric chloride per mole of amine.

7. A process as claimed in claim 4 wherein hydrogen chloride gas is continuously passed through the reaction mixture during the course of the reaction.

References Cited

UNITED STATES PATENTS 2,866,830  12/1958  Dunn, Jr. _____ 260—650 R

OTHER REFERENCES

Groggins: Unit Processes in Organic Synthesis, McGraw-Hill Book Co., Inc., New York, 1958, pp. 237–239, 245–246.

LEWIS GOTTS, Primary Examiner

C. F. WARREN, Assistant Examiner

U.S. Cl. X.R.

260—571, 574, 575, 576, 577, 694